May 10, 1966 W. LAPP ETAL 3,250,160
LATHES
Filed April 15, 1964
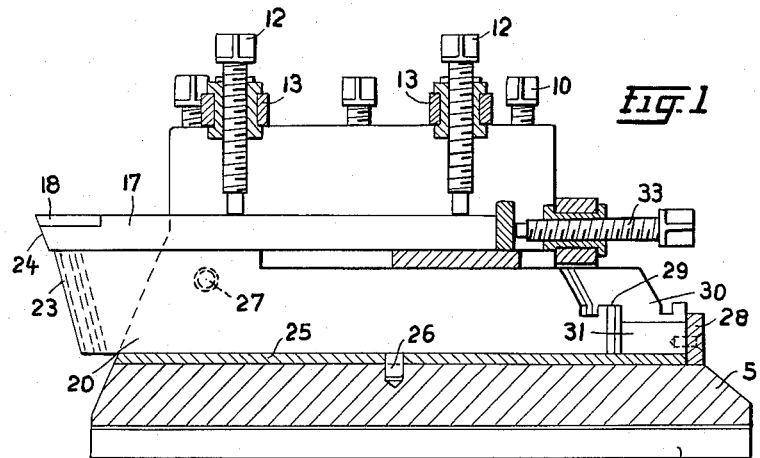
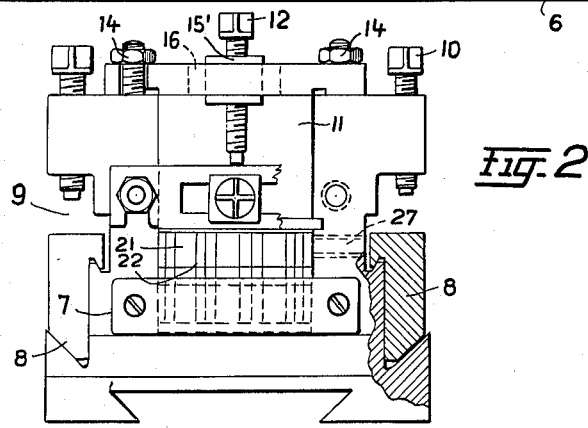
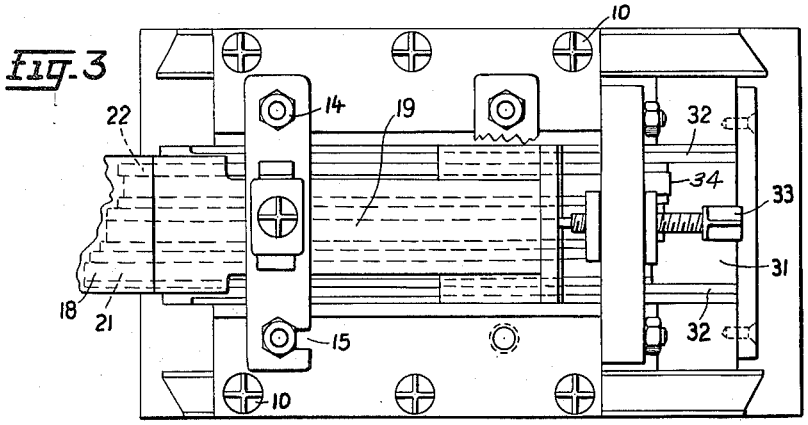
Inventors
W. Lapp
P. Jollet
By Gleason Downing Seibold
Attys.

** 3,250,160
Patented May 10, 1966

**3,250,160
LATHES**
Wilhelm Lapp, deceased, late of St. Michaelstr. 9, Siegen, Germany, by Gertrude Lapp, widow, Christel Lapp and Marianne Lapp, heirs, all of Siegen, Germany; and Paul Jollet, Ruttgerstrasse 30, Aachen, Germany
Filed Apr. 15, 1964, Ser. No. 370,142
8 Claims. (Cl. 82—36)

This is a continuation-in-part of application Serial No. 455,147 filed September 10, 1954.

This invention relates to a tool mounting assembly for application and special utility in an environment of heavy lathes and more particularly to a tool mounting assembly for application to that class of equipment used in turning large rolls for rolling mills and the like as distinguished from ordinary toolroom lathes.

In heavy machining operations, the problems encountered in the construction, operation and maintenance of tool mounting devices are distinctly different from those encountered with conventional toolroom lathes. The mass of the workpiece in heavy machining operations subjects the cutting machinery, and particularly the tool and tool mounting assembly, to severe mechanical stress and vibration. Under these conditions, problems of obtaining the required accuracy and economy of production are presented which are not encountered in light machining operations.

In heavy lathes of the type used for turning massive workpieces which could weigh up to several tons, for example rolls used in rolling mills and the like, a tool slide is included supported by a massive base, a groove is provided in the tool slide extending centrally and longitudinally in the slide in which the tool is placed, clamped by two huge removable bridge pieces crossed in the groove from above and having clamping screws traversing them. The tool is held laterally in the groove, a cross-section of which is greater than the tool, by four screws passing through the side walls of the groove. Despite the large size of the lathe and the massiveness of a workpiece which could weigh several tons, extreme accuracy is required in the turning of the grooves. The operation and fine adjustment of the tool in its turning of grooves is effected by actuating the two rear lateral screws in opposite directions and thereby swinging the tool through a small angle about an axis determined by the front lateral screws. There is also provided a pressure screw in the rear end of the groove enabling the tool to be pressed against the massive work piece within small limits. The distinctive disadvantage of a tool mounting of this type for the machining of massive workpieces which could weigh several tons is that it requires an operator that possesses an extraordinarily high level of skill and many years of experience.

While profile tools have been previously proposed in heavy lathe units of this type, carbide biting bits normally used on such tools are extremely sensitive, and any springing of the tool relative to the mount or shock and vibration would damage the bit. Heretofore it was not possible to clamp adjustable radial tools so rigidly as to prevent springing, shock and vibrations. As a result, it has been necessary to utilize a non-adjustable profile tool as a tangential cutter to prevent this springing of the tool relative to the mount and prevent the consequential damage such action brings.

It is an object of the present invention to provide a tool mounting assembly which may be used to effectuate machining by a form tool which presents the finished profile instead of machining with the customary turning tool.

It is another object of the present invention to provide a tool assembly providing sufficient support for the form tool so that the shank of the form tool may be made relatively thin and light and accordingly easier to handle and adjust.

It is another object of the present invention to provide a tool mounting assembly enabling an operator having only normal skill to achieve an intricate heavy machining operation of the type previously requiring the services of a highly skilled and experienced operator.

Another object of the present invention is to provide a mounting assembly incorporating a tool support formed from a plurality of adjustable strips of varying thickness so that a profile tool may be utilized within a heavy lathe as a radial tool.

It is another object of this invention to facilitate the accurate positioning of the support strips, by one other than a highly skilled operator, by providing a special profile template which not only determines the support configuration assumed by the strips beneath the tool, but which also adds support to the strips during the machining operation and determines the thickness of each strip to be employed.

Another object of this invention is to provide a tool mounting assembly which permits the use of a profile cutting tool as a radial cutting tool in a lathe for turning heavy materials.

It is a further object of this invention to provide a tool mounting assembly for application and special utility in an environment of heavy lathes used in turning large rolls for rolling mills and the like, as distinguished from ordinary toolroom lathes, for mounting an adjustable profile tool, which is free from springing relative to the mount thus avoiding damage to the cutting bit through shock and vibration.

Additional objects and advantages for tool mounting assembly set forth in this invention will be apparent in the course of the following description taken together with the accompanying drawings.

In the drawings:

FIG. 1 is a side view of the lathe tool slide partly in section.

FIG. 2 is a rear view of the tool slide shown in FIG. 1, seen from the operator's end, partly in section.

FIG. 3 is a plan view of the tool slide shown in FIG. 1.

Briefly, this invention contemplates a tool mounting assembly for application and special utility in a heavy lathe of the type employed to machine massive workpieces ranging in weight from hundreds to thousands of pounds, as distinguished from ordinary toolroom lathes of smaller size. The novel mounting assembly of this invention includes a tool slide having a tool groove formed transverse to the normal workpiece axis, a plurality of rigid, individually slidable strips set in said groove, the cross-section of each strip being placed in an upright position to extend upwardly for a uniform distance from the bottom of said groove to support a form tool resting on the top of said strips, a separate template substantially corresponding to the tool profile secured in the end of said groove remote from the workpiece axis against which the ends of each of the strips are set, and means for clamping said tool and strips firmly in said groove after the cutting edge of the tool has been set with respect to the ends of said strips adjacent the workpiece.

As shown in the drawings, the present invention includes a tool slide 5, the side surfaces of which form Z-shaped guides 7 in which the separate tool beams 8 are supported and can be slid forward toward the workpiece. Roughing tools can be positioned upon the beams 8 in the space indicated at 9, and may be pushed forward together with the beams 8 and then clamped by clamping screws 10.

In order to allow horizontal movement of the tool slide 5 along a line transverse to the normal workpiece axis, a dovetail groove 6 is provided in the tool slide 5 for sliding engagement with a dovetail guide provided by a support member (not shown). This support member (which is not shown) may also be provided with similar guide means to allow it to be moved along a horizontal line parallel to the normal workpiece axis and adjustable clamping means so that it may be held stationary in a desired position.

The tool slide 5 includes a substantially extending central tool groove 11 for receiving a precision cutting tool 17, which is provided with a cutting edge 18 corresponding to the groove to be machined. Tool groove 11 is spanned by bridge pieces 13 which carry clamping screws 12 for securing the cutting tool 17 within the tool groove.

Positioned within the tool groove 11 is a strip box 25 which is open at the front and top and includes a low rear wall 28. The strip box 25 is movable with relation to the tool slide and can be swung about a pivot 26 to facilitate handling of the elongated strips 20 when they are being moved in and out of the strip box 25. The strip box 25 contains a packet of strips 20 consisting of a plurality of rigid, elongated strips 20 of varying thickness (see 21 and 22 in FIG. 3 for example) but of the same width and length. The strips 20, which are of varying thicknesses, are set with their cross-sections upright to present flat bearing surfaces to support the underside of tool 17, and each strip is individually, longitudinally slidable so that the edge of the strip packet adjacent the cutting edge of the tool 17 may be formed to correspond with the profile of the cutting edge. The strips are desirably hardened on at least their upper surfaces which support the tool 17, and these surfaces may be ribbed, roughened, or similarly formed or treated.

The tool 17 is normally provided with a shank, the thickness or height of which is no greater than that of its head. The underside of the tool 17, including both its head and its shank, forms a plane surface corresponding uniformly to the tops of the supporting strips 20.

The tool support provided by strips 20 is a great improvement over that provided by a unitary support. Since the thickness of the strips differ, the parts of the cutter profile running at an acute angle to the axis of the workpiece may be supported by very thin strips, while the parts of the profile which are substantially parallel to the axis of the workpiece may be supported by thicker strips as shown in FIG. 3. The front edges of the strips 20 are downwardly and rearwardly inclined (FIG. 1), the angle of inclination being adapted to the clearance angle of the front surface 24 of the tool 17.

The positioning of the individual strips 20 to accurately conform to the profile of the cutting tool 18, and the maintenance of the strips in the suggested position during the cutting operation is accomplished by a contoured template 31. As shown in the drawings, template 31 is positioned at the back of the strip box 25 adjacent the rear wall 28, and includes a stepped outer surface which corresponds to the profile of the tool 17. The strips 20 are provided with hooks 29 on the ends adjacent to template 31 so that they may be drawn back against the template. The hooks 29 project vertically above the top of the template 31 and the rear wall 28 of the strip box 25.

After the hooked ends of the strips are drawn against the stepped surface of the template so that the opposite ends of the strips conform substantially to the profile of the cutting tool, the strips may be clamped firmly against one another in the strip box by means of pressure screws 27.

The template 31 thus operates to accurately position and hold the individual strips 20 in a desired contour. The width of each of the steps 34 of the template may correspond to the thickness of the individual strips to be utilized, so that the degree of support provided by the strip packet may be predetermined by the formulation of the template. The template may be formed to accurately gauge the support necessary for a corresponding profile tool.

When the tool 17 and the corresponding tool mount are subjected to the extreme stresses arising from a heavy machining operation, the template 31 adds support to the rear edges of the strips 20 to prevent accidental longitudinal movement of such strips. Thus the combination of the tool box 25 and the template 31 operates during machining to impart added support for the tool mount.

As a result of the inherent increased stability of the tool mounting assembly set forth in this invention the shank 19 of the tool 17 may be made very thin and light, decreasing its weight and size and greatly improving the ease with which it may be handled and adjusted.

Apart from the swinging movement about the pin 26 of the strip box 25, the tool 17 can also be given a swinging movement about the axis of the screw 12. Further, the tool can be given a fine adjustment through a small distance toward the workpiece by a longitudinally-acting screw 33.

Numerous changes can be made within the scope of the invention. For example, the strip box and the possibility of swinging the strips as a whole made possible by the use of the strip box might be dispensed with. Further, the strips, or some of them, for example two, or two additional strip-like pieces, can be tapered and effect clamping of the packet of the strips in a central groove of the tool slide, and either render the screws 27 superfluous or strengthen their action. Further, the end surfaces 23 of the individual strips 20 need not be flat in horizontal section but can be curved so that the stepped outline as seen in FIG. 3, is replaced by an outline made up of arcs, arrow forms or the like.

Still further, for example, for carrying out roughing, the use of a form tool can also be dispensed with and the strips themselves constructed as individual tools. While care would have to be taken if different strip systems were used, so that the individual strips clear on the sides, nevertheless, such an arrangement can be used without particular difficulty if a sufficiently large stock of strip tools is kept.

It is noted that the description above is for the purpose of explaining the principles of the invention and is not to be construed as restricting or limiting the invention and it is readily understood that the other changes in the details of this invention may be made without departing from the spirit of the invention and the scope of the claims.

Having thus described the invention, what is claimed and desired to be protected by Letters Patent is:

1. In a heavy lathe used in turning massive workpieces such as large rolls for rolling mills and the like as distinguished from ordinary toolroom lathes, a tool mounting assembly comprising a tool slide having a tool groove transverse to the workpiece axis, a plurality of rigid strips set in said groove with their cross-sections in an upright position to extend upwardly a uniform distance from the bottom of said groove, said strips being individually longitudinally slideable, a form tool having a profile cutting edge resting on the tops of said strips, a separate template corresponding generally to the profile of said cutting edge mounted in the end of said groove remote from said workpiece, said template contacting the ends of each of said strips to position and support said strips, and means for clamping said tool and strips firmly in said groove after the cutting edge of the tool has been set with respect to the ends of said strips adjacent the workpiece.

2. The structure as set forth in claim 1, in which said strips are of different thickness in horizontal directions whereby thick strips may be used where the tool profile runs generally parallel to the axis of the workpiece and thinner strips used where the tool profile lies at an angle to the axis of the workpiece.

3. The structure as set forth in claim 2 in which the said template is stepped, the width of the steps corresponding to the desired thickness of the strips to be used.

4. In a heavy lathe of the type used in turning massive workpieces such as large rolls for rolling mills and the like, a tool mounting assembly comprising a tool slide having a tool groove transverse to the workpiece axis, a plurality of rigid strips of uniform depth and equal lengths but of different thicknesses set in said groove with their cross-sections upright to present a flat top surface, said strips being individually longitudinally slidable, a wall across the rear end of said groove, a form tool having a profile cutting edge, a template set against said wall having a stepped front edge profile corresponding to the profile of said cutting edge, each step being of a width such as to place said strips in longitudinal position when said strips are set abutting the front edge of the said template and said profile tool being set with the heel of its profiled edge substantially at the forward end of said strips, means adjacent said strips mounted within said groove for clamping said strips firmly in their said positions and clamping means secured to said tool mounting assembly for clamping said form tool in position upon said strips.

5. A structure as set forth in claim 4 wherein said rear wall is of low height and the rear ends of said strips are formed with hooks at a level above said rear wall in order to facilitate the handling of said strips.

6. The structure as set forth in claim 1 wherein the plurality of rigid strips set in said groove with their cross-sections in an upright position to extend upwardly a uniform distance from the bottom of said groove are positioned within a box set in said groove open at the top and at the side proximate the workpiece and having a low rear wall at the end remote from the workpiece, said strip box being pivotable with relation to said tool slide to facilitate handling of the elongated strips when they are being moved in and out of said box, and said template for positioning and supporting said strips being positioned in and against the low rear wall of said box.

7. The structure as set forth in claim 6 wherein said form tool possesses a head of substantial width and an elongated shank of a substantially narrower width and the underside of said tool forms a plane surface corresponding uniformly to the flat surface formed by said strips.

8. A structure as set forth in claim wherein the head and the shank of said tool are of substantially uniform thickness.

References Cited by the Examiner
UNITED STATES PATENTS

| | | | |
|---|---|---|---|
| 966,658 | 8/1910 | Crick | 29—96 |
| 1,187,099 | 6/1916 | Rogers | 82—36 |
| 1,863,131 | 6/1932 | Taylor | 82—37 |

FOREIGN PATENTS

| | | |
|---|---|---|
| 17,175 | 7/1911 | Great Britain. |

WILLIAM W. DYER, JR., *Primary Examiner.*

L. VLACHOS, *Assistant Examiner.*